Patented Nov. 16, 1937

2,099,510

UNITED STATES PATENT OFFICE 2,099,510

CONDENSATION PRODUCT OF PHENOL PHTHALEIN

Edmond H. Bucy and Robert Watkins, Waukegan, Ill., assignors to Atlas Powder Company, Wilmington, Del., a corporation of Delaware No Drawing. Application April 2, 1936,
Serial No. 72,289

12 Claims. (Cl. 260—2)

This invention relates to condensation products of phenol-phthalein with rosin, with or without non-essential vegetable oils such as castor oil, linseed oil, China wood oil, etc. and is a continuation-in-part of our co-pending application, Serial Number 629,878, filed August 22, 1932, now Patent No. 2,085,183.

It is well known that the synthetic resins made by the reaction between a phenol and an aldehyde, or substances developing aldehydes, have found great use in the manufacture of varnish and lacquers, even though their undesirable property of turning red or pink requires great attention and care in their manufacture. However, even with the greatest care such changes in the color cannot always be avoided and cause waste in material, time and labor.

In addition to this hardship, there is the other that cellulose ester solutions, such as that of nitro-cellulose, cellulose acetate, and those of the cellulose ethers are not compatible with the various classes of resins, or solutions of the same.

Thus, synthetic resins may not always be dissolved in solvents of either nitro-cellulose or cellulose acetate, or solutions of such synthetic resins are not miscible with solutions of the aforesaid cellulose derivatives. Another question to be considered is whether the synthetic resin, if it blends well with the solution of aforesaid cellulose compounds upon evaporation of the solvent, furnishes a film which, if durable, flexible and elastic enough to be acceptable, has the proper luster and gloss.

Although the present market offers various synthetic resins of substantial merit, there is a need for synthetic resins having all the desirable merits of the best known synthetic resins and yet free of the bothersome discolorations heretofore mentioned.

We have found that we may obtain very desirable synthetic resins for the purpose of admixing the same to nitro-acetyl cellulose, or cellulose ethers, by condensing phenol-phthalein with rosin, with or without the addition of various non-essential vegetable oils, such as linseed oil, boiled linseed oil, China wood oil, rape-seed oil, castor oil, olive oil, peanut oil, and other similar oils which are more or less often applied in the line of this art, and various acids such as palmitic, stearic, linoleic, linolenic, oleic, etc., and mixtures thereof.

Our new compounds may be easily introduced into a nitro-cellulose solution, or acetyl-cellulose solution, or into solutions of cellulose ethers, such as methyl-cellulose, ethyl-cellulose, propyl-cellulose, butyl-cellulose and amyl-cellulose.

Benzyl-cellulose and acetyl-cellulose, or their solutions, are representative of the complete series of ethers with which our new synthetic resins, or their solutions, readily blend so as to yield clear and tough films for moving picture purposes, or for coating surfaces of metals, wood, or of cementitious or other compositions, such as used in the building trade. Our new compounds may be suitably used as binders in the molding of all kinds of articles from mixtures of plastic products. In the application of our new resins and the compositions made therefrom, it is of course understood that both natural gums and synthetic resins may be admixed therewith, for instance, phenol-formaldehyde condensation products, novolaks, urea-formaldehyde condensation products, resins consisting of glycerin esters and other similar products.

In order that our invention may be clearly understood, we wish to describe the procedure of making the various synthetic resins, all of which contain the radical of phenol-phthalein in their molecule.

I.—Process for condensing phenol-phthalein with rosin

We mix 1 lb. of rosin with 8 oz. of phenol-phthalein and heat the mixture, suitably under a reflux condenser, in an oil bath up to 480° F.; after this temperature is reached we let the mixture cool down to 420° F. and keep it at this temperature until the reaction is complete, which is noted by the uniformity and clarity of the reaction products. We had cause to notice that the aforesaid temperatures are critical for the result of the process and that the heating should be carefully confined to said temperatures as otherwise the final product will assume a crystalline form instead of remaining in the amorphous state, which is preferable for various purposes. The crystalline product was found to melt at 45° C. (113° F.).

The above description applies when the reacting materials are used without modifiers or catalysts. It is possible by using such modifiers to obviate the necessity of working at such a critical temperature, although with modifiers the first temperature to which the mixture is heated is preferably at least 460° F. and the second temperature to which the reacting mixture is cooled is preferably not greater than 440° F. Therefore, with modifiers or a catalyst, a first temperature range of from 460° to 480° F. and a second temperature range of from 420° to 440° F. are suitable.

The resin thus obtained is soluble in esters, for instance, in the acetates, such as ethyl, amyl, butyl and propyl acetates, the propionates, such as butyl-propionate, the lactates, such as ethyllactate, cellosolve acetate, and the complete series of esters, also alcohols, such as methyl alcohol, ethyl alcohol, propyl alcohol, butyl alcohol, amyl alcohol, ketones, such as acetones, acetates, ethyl-ketone, ethyl-acetate, methyl-acetone, ethyl-methyl-ketone, camphor oil, acetone oil, and other similar solvents.

These resins are for the most part sparingly soluble in coal-tar and petroleum hydrocarbons, but are readily soluble in mixtures of such hydrocarbons when mixed with alcohol or other solvents mentioned above.

The reaction between the phenol-phthalein and the rosin proceeds without or with pressure, with a speed quite satisfactory for technical purposes. We found, however, that the speed of reaction may be remarkably accelerated by adding various accelerating agents to the mixture of the reacting substances; they may be added in an amount of approximately 10% of the phenol-phthalein content (this percentage, however, is not critical and may be varied quite widely one way or the other) to the mixture either before or after the heating has been started. We found it convenient to evenly distribute the accelerating agent through the mixture before the same is heated as this guarantees a more even effect on the molten batch. As accelerating or modifying agents we found particularly suitable p-tertiary amyl-phenol, sodium carbonate; other fairly good agents for this purpose are hydrochloric acid and sodium benzoate.

Although the process of condensing phenol-phthalein with non-essential vegetable oils is described and claimed in our co-pending application above referred to, we have found that remarkable results may be obtained by condensing phenol-phthalein, rosin, and a non-essential vegetable oil. Examples of such resins are as follows:

II.—Phenol-phthalein, rosin, and castor oil—melting point 87° C.

III.—Phenol-phthalein, rosin, and China wood oil—melting point 90° C.

IV.—Phenol-phthalein, rosin, and linseed oil—melting point 85° C.

We may also, in the cases II to IV, apply with success accelerating agents such as p-tertiary amyl-phenol, sodium carbonate, sodium benzoate, and hydrochloric acid.

The mixtures mentioned above were treated as described above under Example I and the amorphous condensation products obtained thereby are soluble in practically all the organic solvents usually applied in the manufacture of varnishes and lacquers except that the products obtained under Examples II to IV are insoluble in straight coal-tar and hydrocarbons.

The condensation products of phenol-phthalein with the various substances referred to in Examples I to IV are all compatible with nitro-cellulose, acetyl-cellulose, or cellulose ethers, for the resins thus obtained dissolve entirely in solutions of the aforesaid cellulose derivatives and the films obtained with them are absolutely clear and transparent. Their mechanical strength is also highly satisfactory, the film being strong and tough and highly resistant to tearing.

The adaptability of our new condensation products is shown by the following examples illustrating the application of the new condensation products in lacquer compositions containing nitro-cellulose, acetyl-cellulose, and cellulose ethylether:

A.—*Nitro-cellulose lacquer*

| | Pounds |
|---|---|
| 3 lb. cut of resin | 4 |
| Butyl alcohol | ½ |
| Butyl acetate | ½ |
| Cellosolve acetate | ½ |
| Ethyl-cellosolve | ½ |
| Lacquer thinner | 5 |
| 20″–30″ nitro-cellulose cut | 5 |

B.—*Cellulose acetate lacquer*

| | Pounds |
|---|---|
| 3 lb. cut of resin in ethyl lactate | 4 |
| Acetone | ½ |
| Ethylene dichloride | ½ |
| Completely denatured alcohol | ½ |
| ½ lb. cellulose acetate solution | 5 |

C.—*Lacquer containing cellulose ethylether*

| | Pounds |
|---|---|
| 4 lb. cut of resin | 3 |
| Completely denatured alcohol | ½ |
| Toluol | ½ |
| ½ lb. ethylether cellulose cut | 5 |

Plasticizing agents may be added to the aforesaid lacquers as well as to films such as may be obtained from any solution of such a condensation product with a nitro or acetyl-cellulose solution, or with a cellulose ether, such as cellulose ethylether.

Upon drying any of the aforesaid lacquers on a glass plate under special conditions, the films obtained may be easily stripped off and are absolutely clear and transparent so that their suitability for photographic purposes is well established. As to their mechanical solidity, it may be said that they are very hard and tough and that they cannot be scratched by passing a finger nail over them.

Our new synthetic resins are suitable for making molded articles from the synthetic resins obtained as described above, either by these resins as such or in admixture with any of the many fillers as applied in the molding, for instance, asbestos, wood flour, silica-earth, since the resins have a melting point below 100° C. and thus can be conveniently melted by simply heating the mold with steam in a manner well-known to the art.

What we claim is as follows:

1. A synthetic resin consisting of the condensation product of phenol-phthalein, rosin, and a non-essential vegetable oil, said product having a melting point in the neighborhood of 85° to 90° C.

2. A synthetic resin consisting of the condensation product of phenol-phthalein, rosin and a non-essential vegetable oil taken from the group consisting of castor oil, linseed oil and China wood oil, said product having a melting point in the neighborhood of 85° to 90° C.

3. A synthetic resin consisting of a condensation product of phenol-phthalein, rosin and castor oil, said product having a melting point in the neighborhood of 87° C.

4. A synthetic resin consisting of the condensation product of phenol-phthalein, rosin and China wood oil, said product having a melting point in the neighborhood of 90° C.

5. A synthetic resin consisting of a condensation product of phenol-phthalein, rosin and linseed oil, said product having a melting point in the neighborhood of 85° C.

6. The process of making an amorphous condensation product of phenol-phthalein and rosin which comprises heating a mixture of phenol-phthalein and rosin to a temperature in the neighborhood of 480° F., cooling the mixture to a temperature in the neighborhood of 420° F., and maintaining the temperature in the neighborhood of 420° F. until the reaction mass has become entirely clear.

7. The process of making an amorphous condensation product of phenol-phthalein, rosin, and a non-essential vegetable oil which comprises heating a mixture of phenol-phthalein, rosin and said oil to a temperature of from 460° to 480° F., cooling the mixture to a second temperature of from 420° to 440° F., maintaining the temperature until the reaction mass has become entirely clear, and separating the oily part of the reaction product from the reaction mass.

8. The process of making a resinous material comprising the condensation product of phenol-phthalein and rosin which comprises heating together the phenol-phthalein and rosin in the presence of an agent selected from the group consisting of sodium carbonate, sodium benzoate, p-tertiary amyl-phenol and hydrochloric acid.

9. The process of making a resinous material comprising the condensation product of phenol-phthalein, rosin and a non-essential vegetable oil which comprises heating together phenol-phthalein, rosin and said oil in the presence of an agent selected from the group consisting of sodium carbonate, sodium benzoate, p-tertiary amyl-phenol and hydrochloric acid.

10. The process of making a resinous material comprising the condensation product of phenol-phthalein and rosin which comprises heating together phenol-phthalein and rosin in the presence of p-tertiary amyl-phenol.

11. The process of making a resinous material comprising the condensation product of phenol-phthalein, rosin, and a non-essential vegetable oil which comprises heating the phenol-phthalein, rosin and non-essential vegetable oil in the presence of p-tertiary amyl-phenol.

12. A synthetic resin comprising an amorphous condensation product of phenol-phthalein and rosin made in accordance with the process of claim 6.

EDMOND H. BUCY.
ROBERT WATKINS.